(12) United States Patent
Chang

(10) Patent No.: US 8,000,089 B2
(45) Date of Patent: Aug. 16, 2011

(54) MODULARIZED DEVICE AND METHOD FOR ASSEMBLING THE SAME

(75) Inventor: Chun Chang, Taipei Hsien (TW)

(73) Assignee: Aopen Inc, Taipei Hsien (TW)

( * ) Notice: Subject to any disclaimer, the term of this patent is extended or adjusted under 35 U.S.C. 154(b) by 202 days.

(21) Appl. No.: 12/314,546

(22) Filed: Dec. 12, 2008

(65) Prior Publication Data

US 2010/0002367 A1 Jan. 7, 2010

(30) Foreign Application Priority Data

Jul. 3, 2008 (TW) ................................ 97125036 A

(51) Int. Cl.
*H05K 5/00* (2006.01)
*H05K 7/00* (2006.01)

(52) U.S. Cl. ......... 361/679.02; 361/679.37; 361/679.39; 361/679.55; 361/679.59

(58) Field of Classification Search ............. 361/679.02, 361/679.37, 679.39, 679.55, 679.56
See application file for complete search history.

(56) References Cited

U.S. PATENT DOCUMENTS

| | | | | |
|---|---|---|---|---|
| 5,774,337 A | * | 6/1998 | Lee et al. ....................... | 361/725 |
| 6,404,625 B1 | * | 6/2002 | Chen et al. ............... | 361/679.33 |
| 6,452,792 B1 | * | 9/2002 | Chen ......................... | 361/679.35 |
| 6,970,346 B2 | * | 11/2005 | Shih .......................... | 361/679.02 |
| 2003/0206397 A1 | * | 11/2003 | Allgeyer et al. .............. | 361/685 |

FOREIGN PATENT DOCUMENTS

| | | |
|---|---|---|
| TW | 407847 | 10/2000 |
| TW | 467363 | 12/2001 |
| TW | M243713 | 9/2004 |

OTHER PUBLICATIONS

Taiwanese Office Action in Serial No. 097125036, corresponding to U.S. Appl. No. 12/314,546.

* cited by examiner

*Primary Examiner* — Jayprakash N Gandhi
*Assistant Examiner* — Anthony M Haughton
(74) *Attorney, Agent, or Firm* — Davidson Berquist Jackson & Gowdey, LLP

(57) ABSTRACT

A modularized device includes a seat body, a first assembly unit, a cover, and a second assembly unit. The first assembly unit is fixed within the seat body and includes a first engaging portion. The cover removably covers the seat body. The second assembly unit is mounted on a bottom surface of the cover and is movable relative to the cover. The second assembly unit includes a second engaging portion having a shape complementary to that of the first engaging portion. The second assembly unit is movable relative to the cover to compensate an amount of deviation caused by tolerances so that the second engaging portion is adjustable to correspondingly engage the first engaging portion when the cover is secured to the seat body.

7 Claims, 9 Drawing Sheets

MODULARIZED DEVICE AND METHOD FOR ASSEMBLING THE SAME

CROSS-REFERENCE TO RELATED APPLICATION

This application claims priority of Taiwanese Application No. 097125036, filed on Jul. 3, 2008.

BACKGROUND OF THE INVENTION

1. Field of the Invention

The invention relates to a modularized device and a method for assembling the same, more particularly to a modularized device capable of compensating tolerance and a method for assembling the same.

2. Description of the Related Art

Due to limitation of inner space and requirement for enhancing assembly convenience, modularized design concepts are adapted for storage components (such as a hard disk drive, an optical disk drive, or the like) in a mini-computer system. A riser card is used to interconnect power supplies and electrical signals of the storage devices so as to form a storage device module. Generally, the mini-computer system includes a top cover, a storage device module pre-mounted on an inner surface of the top cover, a bottom plate, and a system body pre-mounted on the bottom plate.

Assembly of the computer system can be achieved by coupling the storage device module to the system body and inserting the riser card of the storage device module into a socket of the system body. The aforesaid design eliminates the step of arranging ribbon wires, reduces assembly time, and enhances user convenience.

Referring to FIGS. 1 and 2, a conventional mini-computer system 1 includes a top cover 11, a storage device module 12 pre-mounted on an inner surface of the top cover 11, a bottom plate 13, and a system body 14 pre-mounted on the bottom plate 13. The storage device module 12 includes a holder 121 secured on the top cover 11, and at least one storage device 122 and a riser card 123 secured on the holder 121.

However, when the holder 121, the storage device 122, and the riser card 123 are fastened together using screws to form the storage device module 12, and when the holder 121 is assembled to the top cover 11, the respective dimensional tolerances of the holder 121, the storage device 122, and the riser card 123, combined with assembly tolerance caused by assembly of the holder 121, the storage device 122, and the riser card 123, result in deviation of the riser card 123.

Therefore, when the storage device module 12 is assembled to the system body 14, the amount of deviation caused by the aforesaid tolerances may result in position deviation of the riser card 123 of the storage device module 12, so that the riser card 123 can not be inserted into a socket 141 or needs to be inserted obliquely into the socket 141. The transmission of electrical signals is therefore affected, which may result in breakdown of the computer system 1.

SUMMARY OF THE INVENTION

An object of the present invention is to provide a modularized device capable of compensating tolerance.

Another object of this invention is to provide a method for assembling a modularized device capable of compensating tolerance.

Accordingly, the modularized device of this invention includes a seat body, a first assembly unit, a cover, and a second assembly unit. The first assembly unit is fixed within the seat body and includes a first engaging portion. The cover removably covers the seat body. The second assembly unit is mounted on a bottom surface of the cover and is movable relative to the cover. The second assembly unit includes a second engaging portion having a shape complementary to that of the first engaging portion. The second assembly unit is movable relative to the cover to compensate an amount of deviation caused by tolerances so that the second engaging portion is adjustable to correspondingly engage the first engaging portion when the cover is secured to the seat body.

Preferably, the second assembly unit further includes a holder connected movably to the cover. The second engaging portion is fixed on the holder. The holder is formed with a plurality of guiding slots. The bottom surface of the cover is formed with a plurality of guiding hooks that are slidably inserted into the guiding slots. The guiding slots and the guiding hooks are arranged so that the second assembly unit and the cover are movable relative to each other.

Preferably, the modularized device further includes a resilient member that is connected to the cover and the holder of the second assembly unit, and that buffers relative sliding movement between the cover and the second assembly unit.

Preferably, the cover further includes an upright portion. The resilient member is configured as a hollow cylindrical resilient body, is engaged in the upright portion, and has an end face abutting against the holder. The modularized device further comprises a bolt for coupling the resilient member to the holder.

Preferably, the seat body includes two positioning holes. The cover further includes two positioning studs that are respectively inserted into the positioning holes in the seat body when the cover is secured to the seat body.

Preferably, the modularized device further includes a plurality of screw bolts for threadedly engaging the holder of the second assembly unit with the seat body after the cover is secured to the seat body and the second engaging portion is adjusted to correspondingly engage the first engaging portion.

Preferably, the modularized device further includes two side plates for positioning the cover in place relative to the seat body.

Preferably, the second assembly unit further includes at least one storage member fixed on the holder. The second engaging portion is a riser card electrically connected to a power source and electrical signals of the storage member.

Preferably, the first assembly unit further includes a circuit board and at least one electronic component mounted on the circuit board. The first engaging portion is a socket provided on the circuit board for insertion of the riser card.

The method for assembling a modularized device of this invention includes the steps of:

providing a seat body and a first assembly unit fixed within the seat body, the first assembly unit including a first engaging portion;

providing a cover capable of removably covering the seat body and a second assembly unit, the second assembly unit including a second engaging portion that is complementary in shape to the first engaging portion, the second assembly unit being mounted on a bottom surface of the cover and being movable relative to the cover;

registering and engaging the second engaging portion with the first engaging portion;

adjusting the position of the cover relative to the second engaging portion; and securing the cover on the seat body.

The effect of this invention is that the second assembly unit is movable relative to the cover to compensate an amount of deviation caused by tolerances so that the second engaging portion is adjustable to correspondingly engage the first engaging portion when the cover is secured to the seat body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
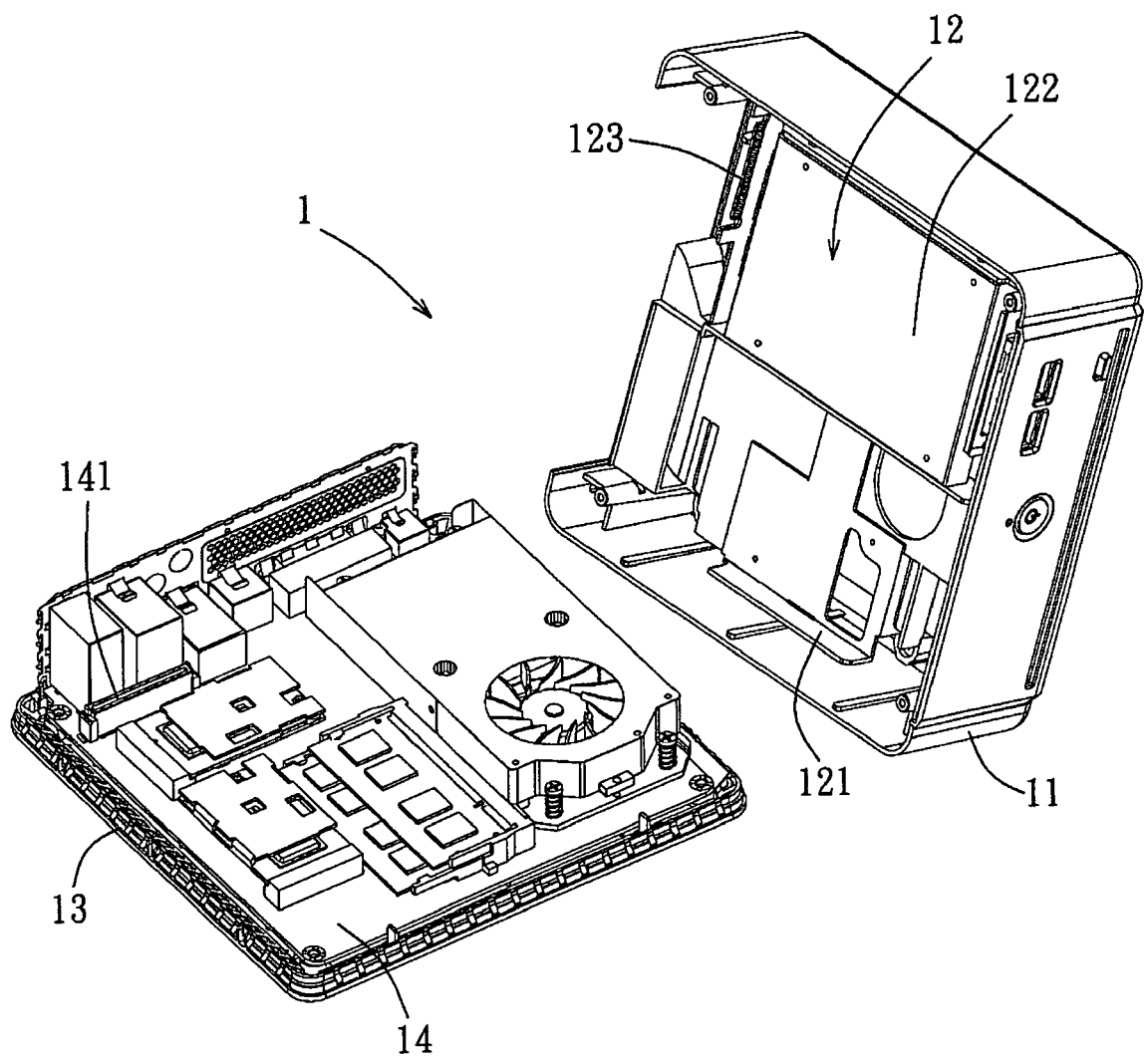
FIG. 1 is a partly exploded perspective view of a conventional mini-computer system.
Figure 2:
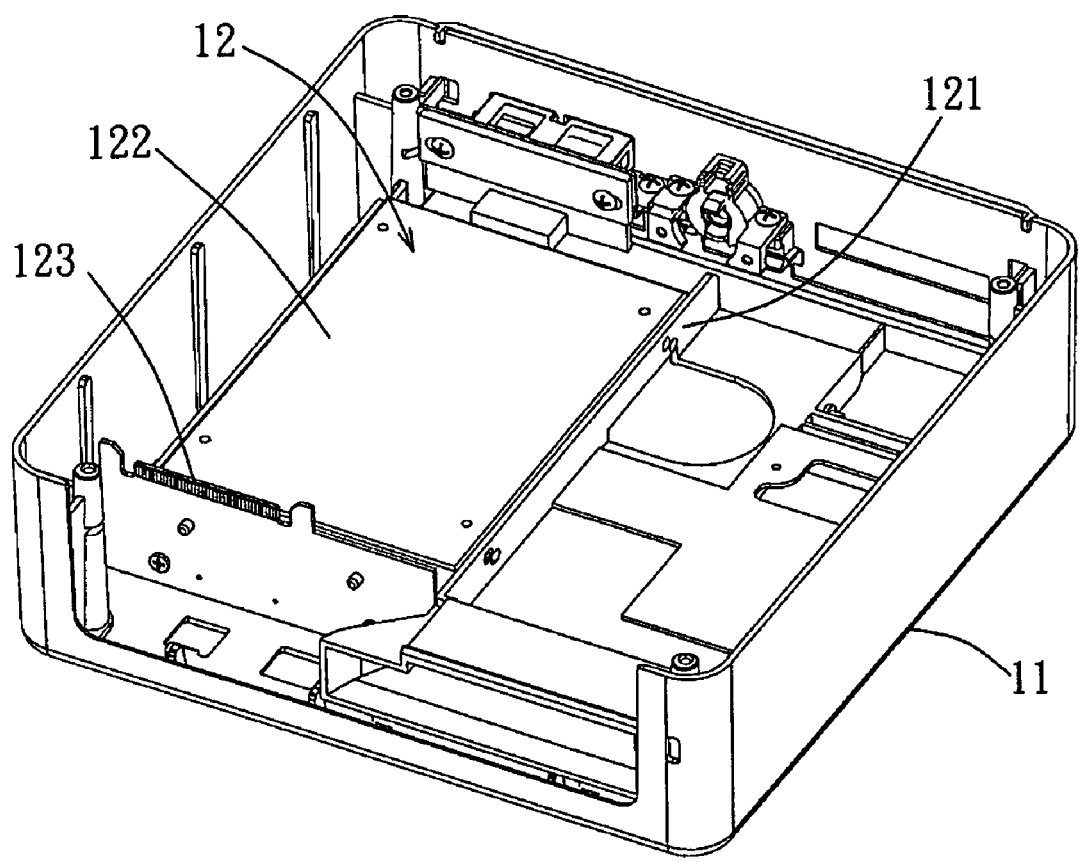
FIG. 2 is a perspective view illustrating a top cover and a storage device module of the conventional mini-computer system.
Figure 3:
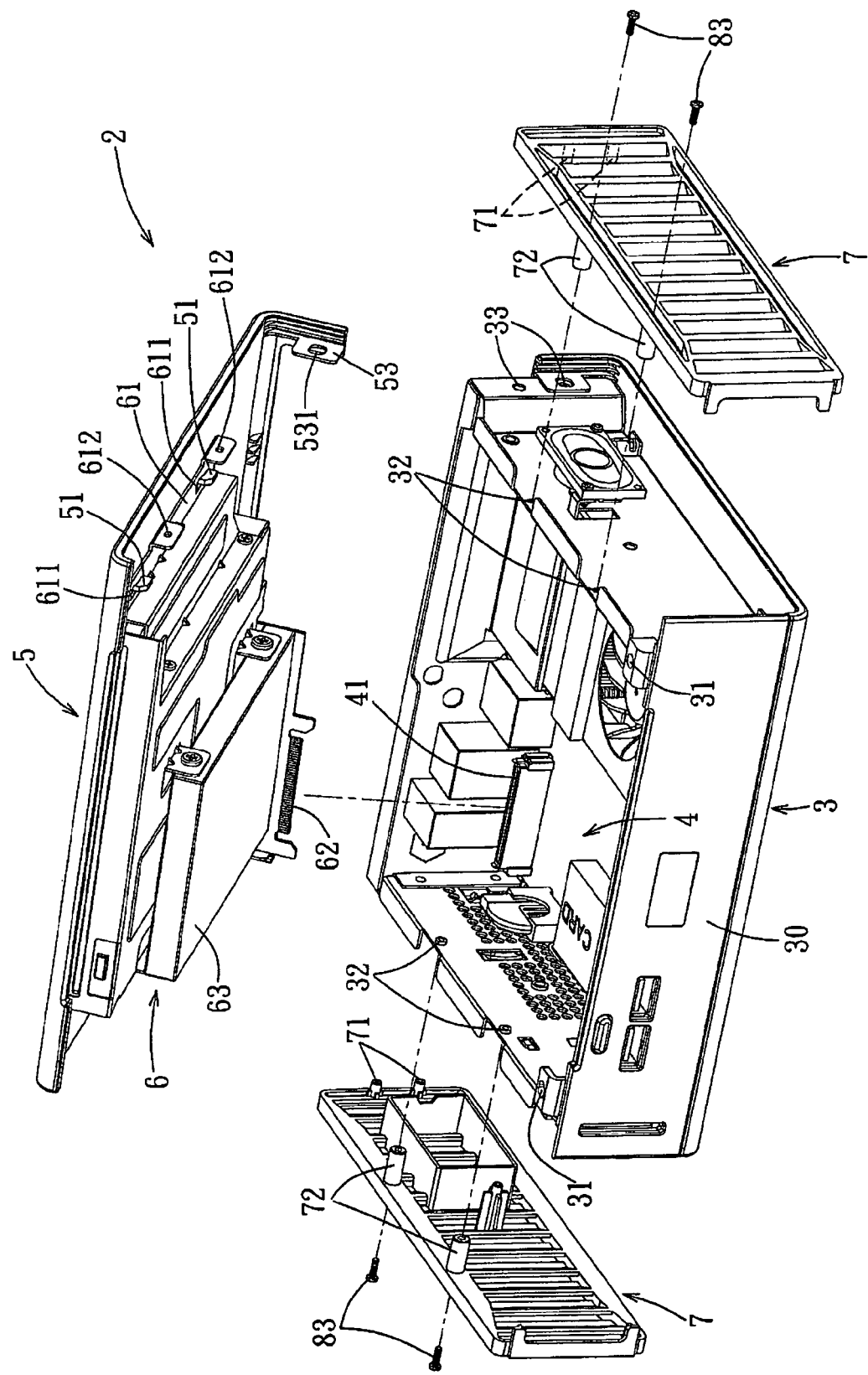
FIG. 3 is a partly exploded perspective view of a preferred embodiment of a modularized device according to this invention.
Figure 4:
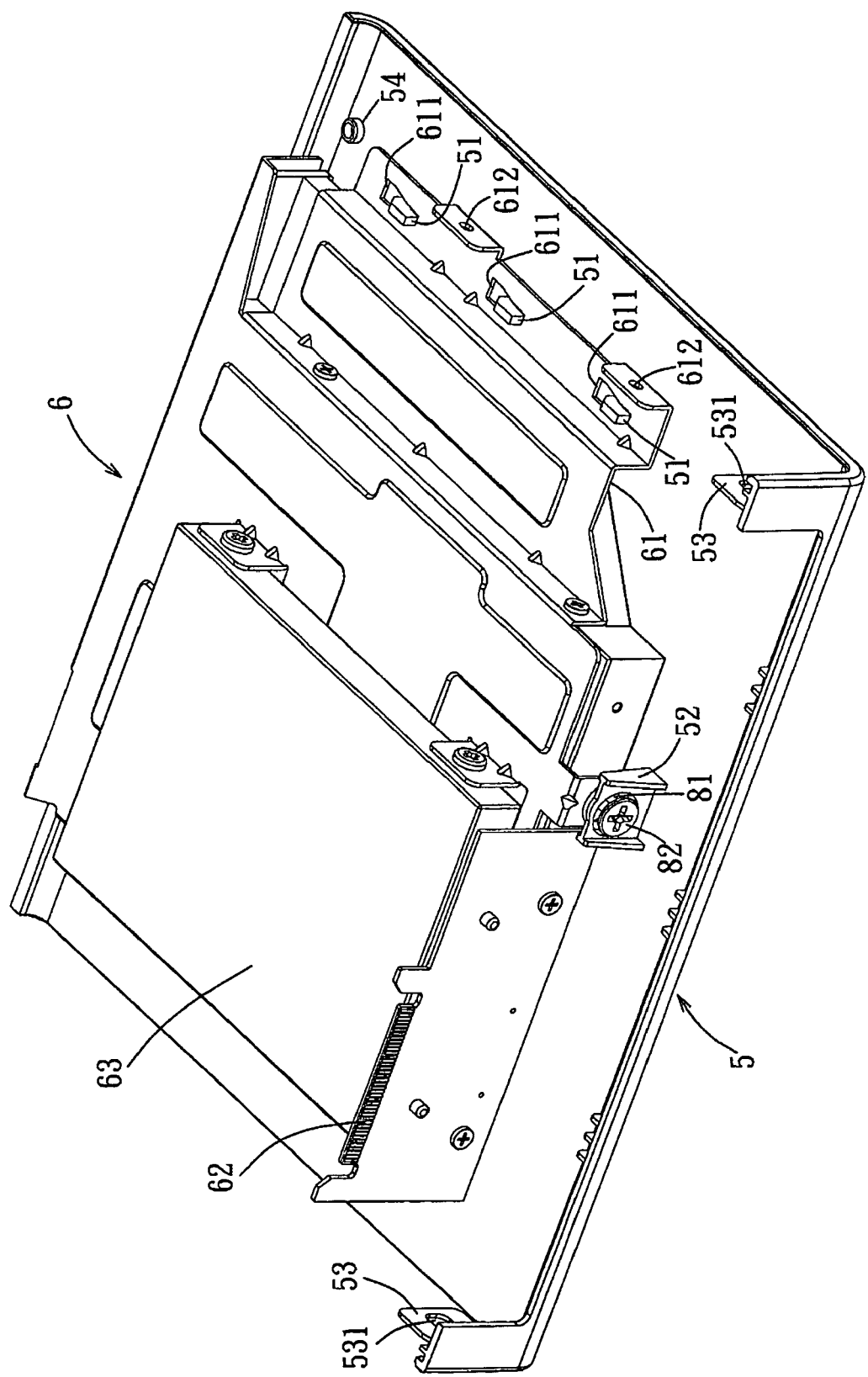
FIG. 4 is a perspective view illustrating a cover and a second assembly unit of the preferred embodiment.

Referring to FIGS. 3 and 4, the preferred embodiment of a modularized device 2 according to this invention includes a seat body 3, a first assembly unit 4, a cover 5, a second assembly unit 6, two side plates 7, and a resilient member 81. In the preferred embodiment, the modularized device 2 is a mini-computer system.

The seat body 3 includes a shell body 30, two positioning holes 31 provided in a top edge of the shell body 30, and a plurality of threaded holes 32 and through holes 33 extending through left and right sides of the shell body 30.

The first assembly unit 4 is fixed within the seat body 3, and includes a circuit board, at least one electronic component mounted on the circuit board, and a first engaging portion 41. In the preferred embodiment, the first engaging portion 41 is a socket provided on the circuit board.

Figure 5:
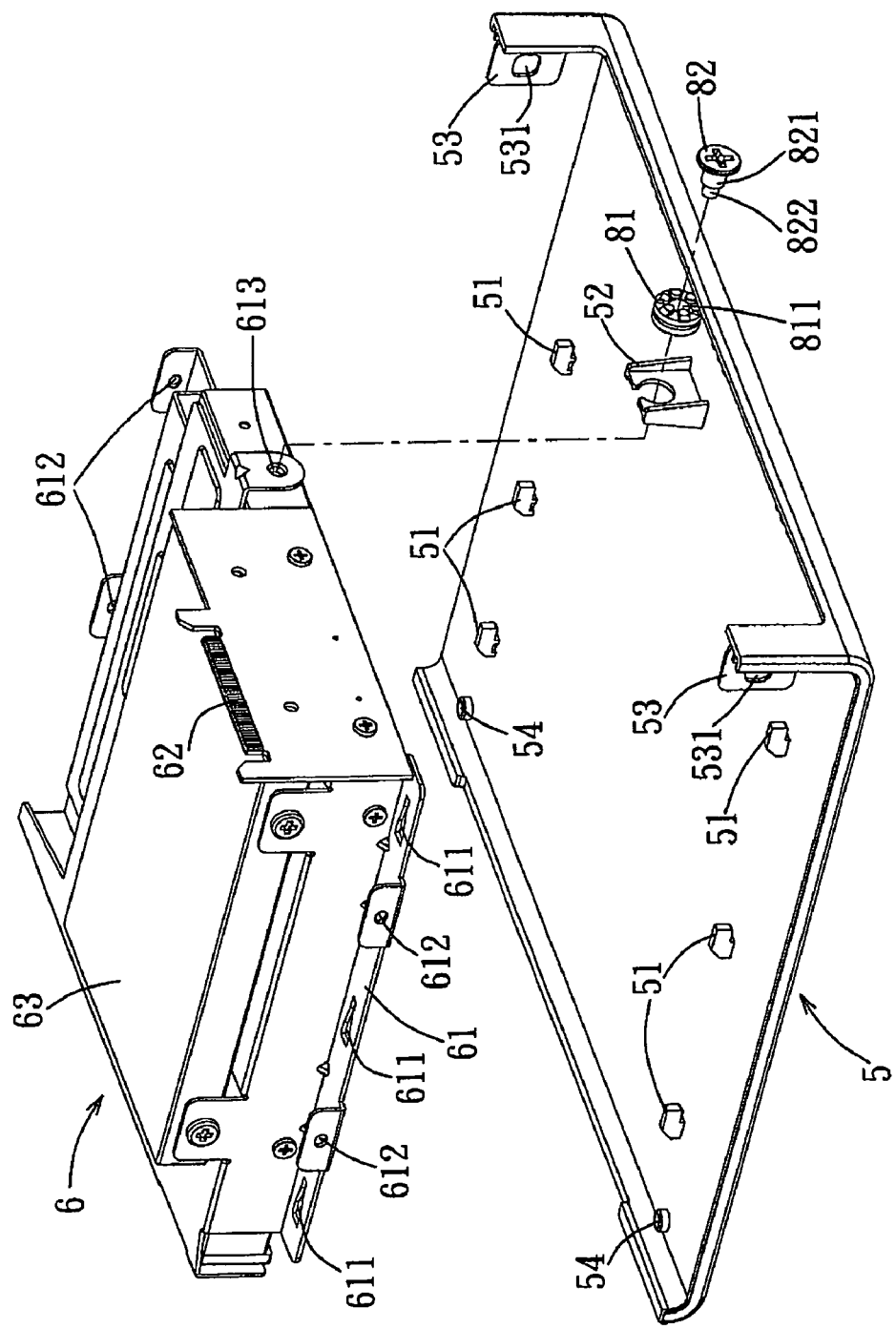
FIG. 5 is a partly exploded perspective view of FIG. 4.

Referring to FIGS. 3, 4, and 5, the cover 5 is designed to removably cover the seat body 3, and has a bottom surface formed with six guiding hooks 51, an upright portion 52 disposed proximate to the center of a front side thereof, two connecting portions 53 disposed at left and right ends of the front side, and two positioning studs 54 disposed proximate to a rear side thereof. Three of the guiding hooks 51 are disposed proximate to a left side of the bottom surface of the cover 5, and the other three of the guiding hooks 51 are disposed proximate to a right side of the bottom surface of the cover 5. The upright portion 52 is provided with a curved recess in a top end thereof. Each of the connecting portions 53 is formed with a through hole 531. The positioning studs 54 are respectively inserted into the positioning holes 31 in the seat body 3 during assembly.

Referring to FIGS. 4 and 5, the second assembly unit 6 is mounted on the bottom surface of the cover 5 and is movable relative to the cover 5. The second assembly unit 6 includes a holder 61 connected movably to the cover 5, a second engaging portion 62 fixed on the holder 61 and having a shape complementary to that of the first engaging portion 41, and at least one storage member 63 fixed on the holder 61. In the preferred embodiment, the second engaging portion 62 is a riser card electrically connected to a power source and electrical signals of the storage member 63 and inserted into the socket, i.e., the first engaging portion 41. The storage member 63 is an optical disk drive or a hard disk drive.

The holder 61 is formed with three guiding slots 611 in each of the left and right sides thereof for slidable insertion of the guiding hooks 51 of the cover 5 therein, respectively. Due to the arrangement of the guiding slots 611 and the guiding hooks 51, the second assembly unit 6 and the cover 5 are movable relative to each other in a front-rear direction. Additionally, the holder 61 is formed with two holes 612 in each of the left and right sides thereof, and a threaded hole 613 in a front side thereof.

Although the relative movement between the second assembly unit 6 and the cover 5 is achieved by the cooperation of the guiding slots 611 with the guiding hooks 51 in this embodiment, it can be achieved in other manners (e.g., using sliding tracks), and should not be limited to the disclosed embodiment.

Figure 6:
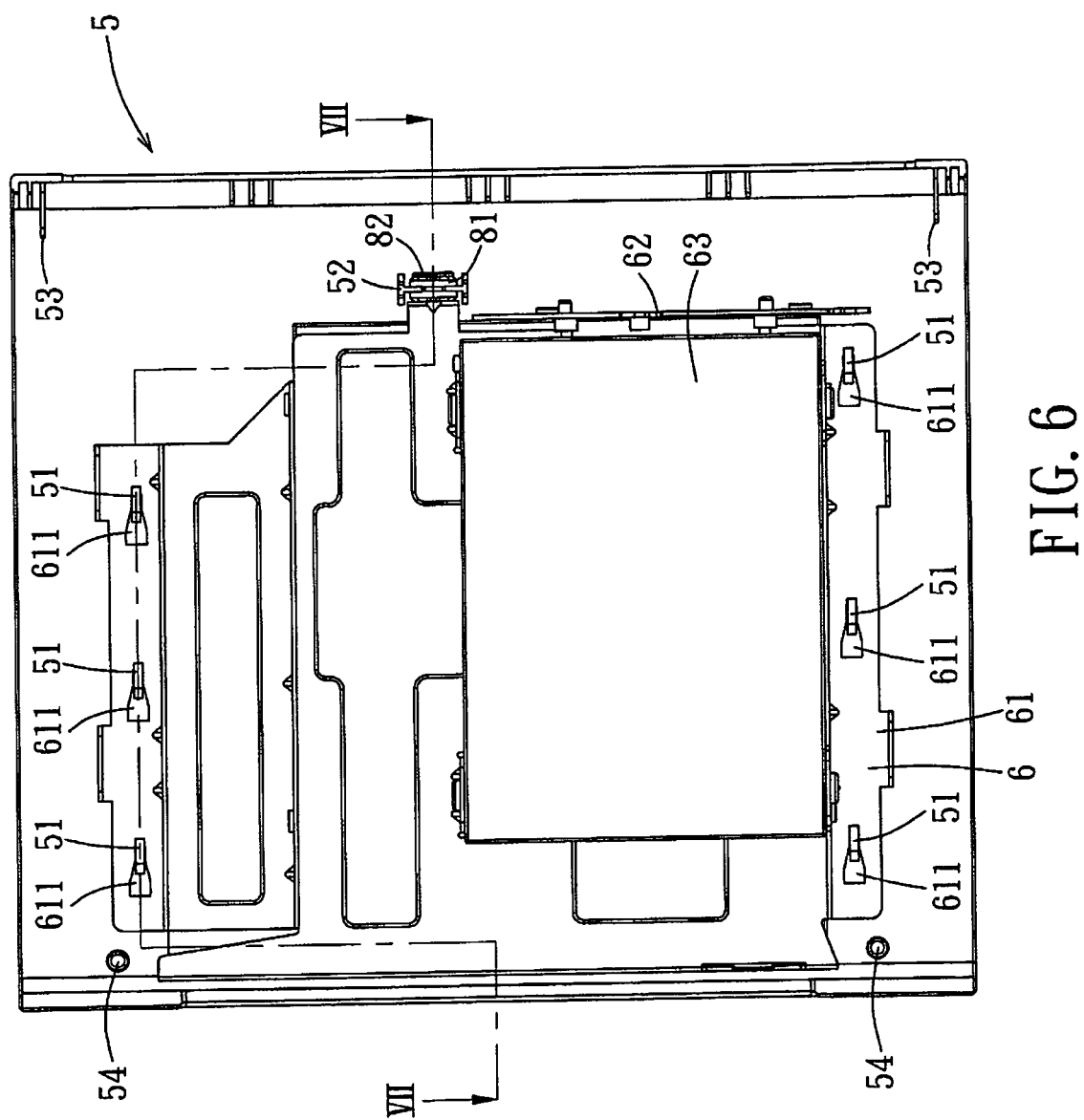
FIG. 6 is a top view of FIG. 4.
Figure 7:
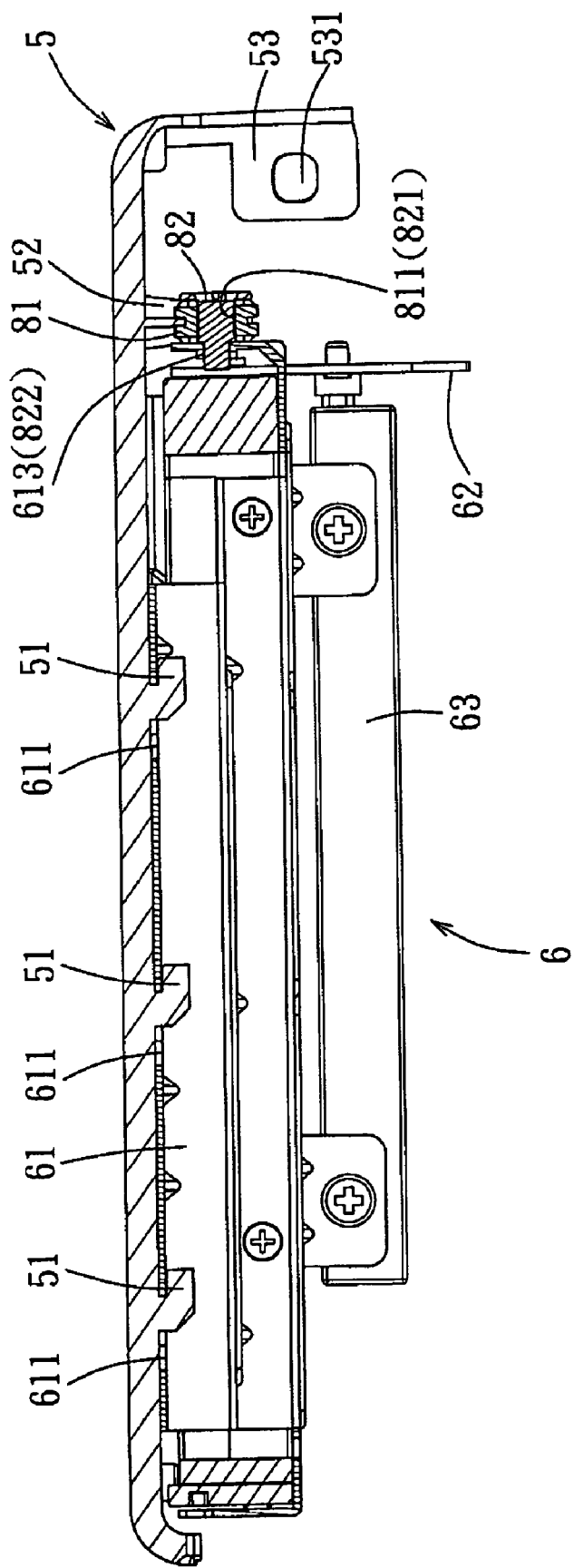
FIG. 7 is a sectional view taken along line VII-VII of FIG. 6.

Referring to FIGS. 5, 6, and 7, the resilient member 81 has two ends connected respectively to the cover 5 and the holder 61 of the second assembly unit 6. The resilient member 81 buffers the relative sliding movement between the cover 5 and the second assembly unit 6, and limits the amount of relative movement. In the preferred embodiment, the resilient member 81 is configured as a hollow cylindrical resilient body, is engaged in the curved recess in the upright portion 52, and has an end face abutting against the holder 61. A bolt 82 is used to couple the resilient member 81 to the holder 61, and includes a large-diameter portion 821 and a small-diameter portion 822 having a diameter smaller than that of the large-diameter portion 821. The bolt 82 passes through a through hole 811 in the resilient member 81, with the large-diameter portion 821 retained in the through hole 811 and the small-diameter portion 822 threadedly engaged in the threaded hole 613 in the holder 61. The aforesaid amount of relative movement is correlated to the thickness and the coefficient of elasticity of the resilient member 81, and is designed to have a value ranging from −0.8 mm to +0.8 mm in this embodiment. This value is sufficient for compensating dimensional tolerances of the respective components and assembly tolerance resulting from assembly of the components. It should be specifically mentioned that, in addition to buffering the relative movement between the cover 5 and the second assembly unit 6, use of the resilient member 81 can avoid collision between the cover 5 and the second assembly unit 6 in case of loosening so that the user will not have a bad impression about the quality of the product.

In other embodiments of this invention, the resilient member 81 can be configured to be a compression spring or a reed connecting the cover 5 and the holder 61 of the second assembly unit 6 as long as the buffering of the relative movement between the cover 5 and the second assembly unit 6 can be achieved and the amount of relative movement can be limited.

Figure 8:
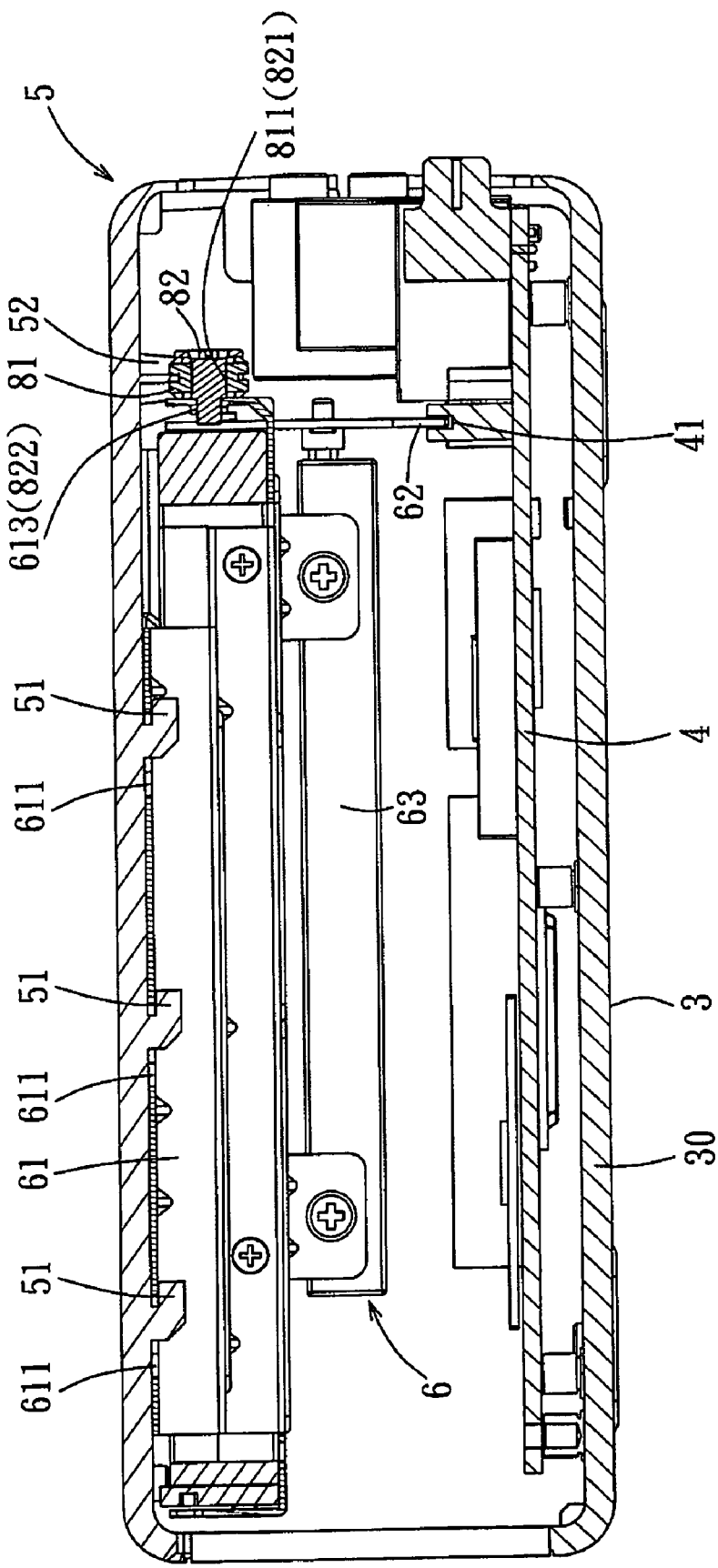
FIG. 8 is a schematic sectional view of the preferred embodiment.

Referring to FIGS. 3 and 8, each of the side plates 7 includes two posts 71 and two internally threaded posts 72 extending toward the seat body 3. The posts 71 of the side plates 7 extend respectively through the through holes 33 in the seat body 3 and the through holes 531 in the cover 5 to position the cover 5 in place relative to the seat body 3. Screw bolts 83 are sequentially and respectively extended through the internally threaded posts 72 of the side plates 7 and the holes 612 in the holder 61 of the second assembly unit 6, and are threadedly and respectively engaged with the threaded holes 32 in the seat body 3.

Since the second assembly unit 6 is configured to be movable relative to the cover 5, the amount of deviation caused by the tolerances can be compensated, so that the second engaging portion 62 is adjustable to correspondingly engage the first engaging portion 41 when the cover 5 is secured to the seat body 3 during assembly of the modularized device 2.

It is particularly noted that in this embodiment, although the seat body 3 has a specific number of the positioning holes 31, the threaded holes 32, and the through holes 33, the cover 5 has a specific number of the guiding hooks 51, the connecting portions 53, the through holes 531, and the positioning studs 54, the holder 61 has a specific number of the guiding slots 611 and the holes 612, and the side plates 7 have a specific number of the posts 71 and the internally threaded posts 72, the various components may vary in number and should not be limited by the disclosed embodiment.

Figure 9:
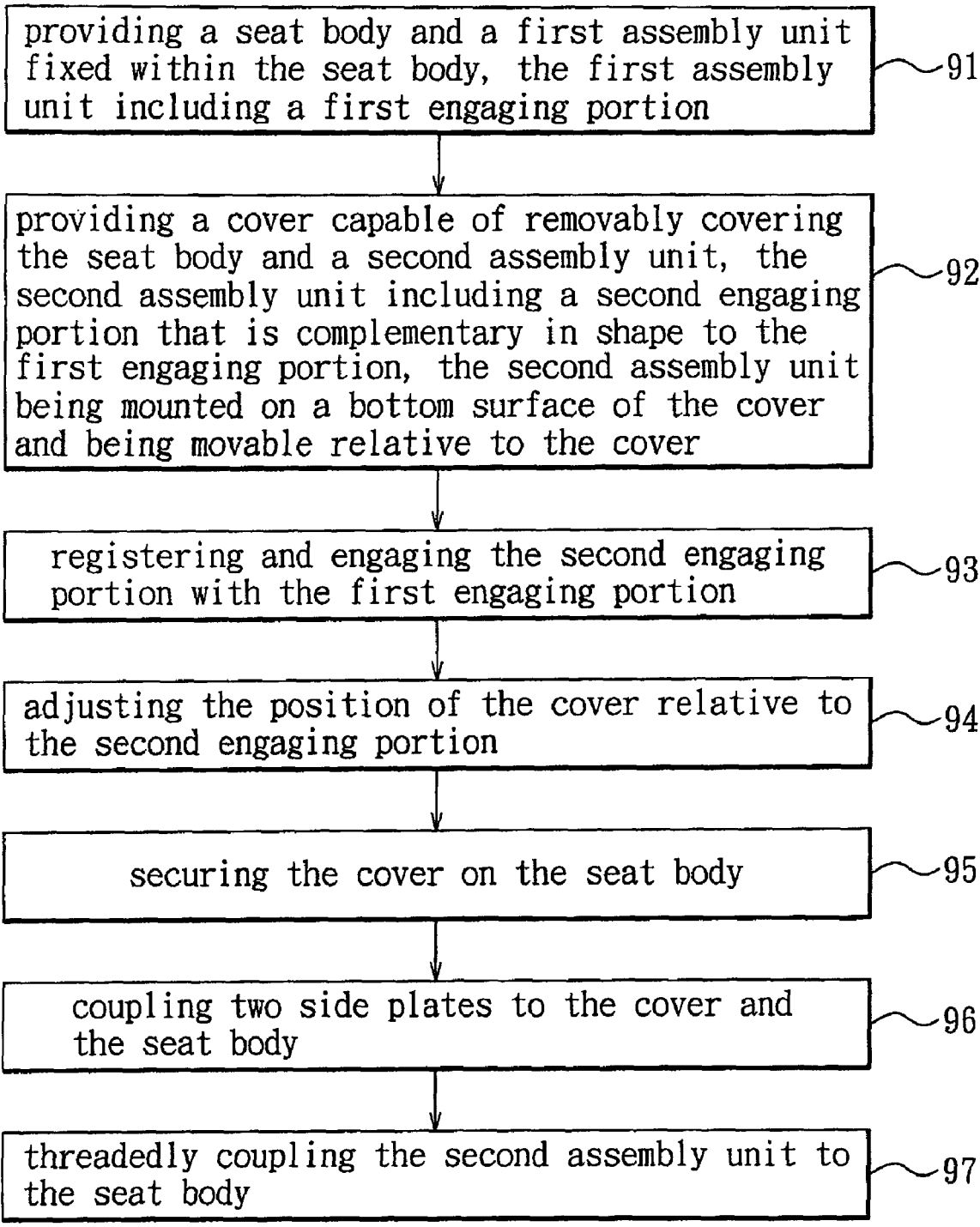
FIG. 9 is a flow chart illustrating a method for assembling the preferred embodiment.

Referring to FIGS. 3, 8, and 9, a method for assembling a modularized device according to this invention will be described hereinbelow. FIG. 9 is a flow chart to illustrate steps of assembling the preferred embodiment of the modularized device 2.

In step 91, a seat body 3 and a first assembly unit 4 fixed within the seat body 3 are provided. The first assembly unit 4 includes a first engaging portion 41.

In step 92, a cover 5 capable of removably covering the seat body 3 and a second assembly unit 6 are provided. The second assembly unit 6 includes a second engaging potion 62 that is complementary in shape to the first engaging portion 41. The second assembly unit 6 is mounted on a bottom surface of the cover 5 and is movable relative to the cover 5.

In step 93, the second engaging portion 62 is registered with and is engaged with the first engaging portion 61.

In step 94, the position of the cover 5 relative to the second engaging portion 62 is adjusted.

In step 95, the cover 5 is secured on the seat body 3.

In step 96, two side plates 7 are coupled to the cover 5 and the seat body 3.

In step 97, the second assembly unit 6 is threadedly coupled to the seat body 3.

The aforesaid steps will be discussed in detail hereinafter. In step 94, the adjustment of the position of the cover 5 relative to the second engaging portion 62 is to adjust the displacement of the cover 5 in a front-rear direction.

In step 95, positioning studs 54 of the cover 5 are correspondingly inserted into positioning holes 31 in the seat body 3 to secure the cover 5 to the seat body 3. After the cover 5 is fitted in place, through holes 531 in the cover 5 are correspondingly aligned with through holes 33 in the seat body 3.

In step 96, when the two side plates 7 are being fitted in place, posts 71 of the side plates 7 sequentially pass through the through holes 531 in the cover 5 and the through holes 33 in the seat body 3 so as to secure the cover 5 to the seat body 3 more firmly.

In step 97, a plurality of threaded bolts 83 are first extended through the internally threaded posts 72 of the side plates 7 and then through the holes 612 in the holder 61 of the second assembly unit 6 to be threadedly engaged in the threaded holes 32 in the seat body 3, thereby completing assembly of the modularized device 2. Furthermore, step 97 ensures the exact assembly position of the second engaging portion 62 relative to the first engaging portion 41, and prevents deviation of the second engaging portion 62 in the front-rear direction due to vibration or impact.

The aforesaid method of assembly can solve the problem of deviation caused by tolerance as encountered in the assembly of the conventional modularized device, and avoids situations where the riser card can not be inserted into the socket or has to be obliquely inserted into the socket, so that the second engaging portion 62 is properly engaged with the first engaging portion 41 and the cover 5 can be properly secured to the seat body 3 after assembly.

In sum, the deviation caused by tolerance can be compensated by configuring the second assembly unit 6 to be movable relative to the cover 5, so that the second engaging portion 62 is adjustable to correspondingly engage the first engaging portion 41 when the cover 5 is secured to the seat body 3, thereby avoiding occurrence of error during assembly of the second engaging portion 62 and enhancing the quality and reliability of the modularized device 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A modularized device comprising:
   a seat body;
   a first assembly unit fixed within said seat body and including a first engaging portion;
   a cover removably covering said seat body;
   a second assembly unit mounted on a bottom surface of said cover, movable relative to said cover, and including a second engaging portion having a shape complementary to that of said first engaging portion and a holder connected movably to said cover, said second engaging portion being fixed on said holder; and
   a resilient member that is connected to said cover and said holder of said second assembly unit, and that buffers relative sliding movement between said cover and said second assembly unit,
   wherein said second assembly unit is movable relative to said cover to compensate an amount of deviation caused by tolerances so that said second engaging portion is adjustable to correspondingly engage said first engaging portion when said cover is secured to said seat body, and
   wherein said cover further includes an upright portion, said resilient member being configured as a hollow cylindrical resilient body, being engaged in said upright portion, and having an end face abutting against said holder, said modularized device further comprising a bolt for coupling said resilient member to said holder.

2. The modularized device as claimed in claim 1, wherein said holder is formed with a plurality of guiding slots, said bottom surface of said cover being formed with a plurality of guiding hooks that are slidably inserted into said guiding slots, said guiding slots and said guiding hooks being arranged so that said second assembly unit and said cover are movable relative to each other.

3. The modularized device as claimed in claim 1, wherein said seat body includes two positioning holes, said cover further including two positioning studs that are respectively inserted into said positioning holes in said seat body when said cover is secured to said seat body.

4. The modularized device as claimed in claim 1, further comprising a plurality of screw bolts for threadedly engaging said holder of said second assembly unit with said seat body after said cover is secured to said seat body and said second engaging portion is adjusted to correspondingly engage said first engaging portion.

5. The modularized device as claimed in claim 1, further comprising two side plates for positioning said cover in place relative to said seat body.

6. The modularized device as claimed in claim 1, wherein said second assembly unit further includes at least one storage member fixed on said holder, said second engaging portion being a riser card electrically connected to a power source and electrical signals of said storage member.

7. The modularized device as claimed in claim 6, wherein said first assembly unit further includes a circuit board and at least one electronic component mounted on said circuit board, said first engaging portion being a socket provided on said circuit board for insertion of said riser card.

* * * * *